(12) United States Patent
Sheridan

(10) Patent No.: US 11,882,368 B1
(45) Date of Patent: Jan. 23, 2024

(54) CIRCULAR IMAGE FILE

(71) Applicant: Apple Inc., Cupertino, CA (US)

(72) Inventor: Ryan M. Sheridan, Huntington Beach, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/710,702

(22) Filed: Mar. 31, 2022

Related U.S. Application Data

(60) Provisional application No. 63/180,367, filed on Apr. 27, 2021.

(51) Int. Cl.
| | |
|---|---|
| *H04N 23/80* | (2023.01) |
| *H04N 25/44* | (2023.01) |
| *H04N 23/45* | (2023.01) |
| *H04N 23/60* | (2023.01) |
| *H04N 25/445* | (2023.01) |
| *H04N 25/443* | (2023.01) |

(52) U.S. Cl.
CPC ............. *H04N 23/80* (2023.01); *H04N 23/45* (2023.01); *H04N 23/665* (2023.01); *H04N 25/443* (2023.01); *H04N 25/445* (2023.01)

(58) Field of Classification Search
CPC .... H04N 23/80; H04N 25/443; H04N 25/445; G06F 3/06
USPC ....................................................... 348/231.2
See application file for complete search history.

(56) References Cited

U.S. PATENT DOCUMENTS

| | | | | |
|---|---|---|---|---|
| 2009/0268046 | A1* | 10/2009 | Ogawa ................... | H04N 19/85 348/222.1 |
| 2014/0168357 | A1* | 6/2014 | Venable ................ | G03B 37/04 348/38 |
| 2019/0082183 | A1* | 3/2019 | Shih ...................... | H04N 19/625 |
| 2019/0174116 | A1* | 6/2019 | Oh ........................ | H04N 13/194 |
| 2021/0195118 | A1* | 6/2021 | Mustapha ............. | H04N 5/2628 |
| 2021/0385394 | A1* | 12/2021 | Miyawaki .......... | H01L 27/14623 |

FOREIGN PATENT DOCUMENTS

| | | | | |
|---|---|---|---|---|
| JP | 2006140581 | A | * 6/2006 | .............. H02M 1/32 |

* cited by examiner

*Primary Examiner* — Anthony J Daniels
(74) *Attorney, Agent, or Firm* — Fernando & Partners, LLP

(57) ABSTRACT

In one implementation, a camera includes an image sensor including a plurality of sensor elements at a respective plurality of first image sensor locations. The camera includes a controller to receive, from the image sensor, a plurality of sensor values indicative of a characteristic of light impinging on the plurality of sensor elements and generate, based on the plurality of sensor values, an image file including a plurality of pixels having a respective plurality of pixel values, wherein the plurality of pixels are associated with a respective plurality of pixel locations that represent a respective plurality of second image sensor locations. The plurality of second image sensor locations are within a circle and the image file does not include a pixel having a pixel location representing an image sensor location outside the circle and within a square in which the circle is inscribed.

20 Claims, 8 Drawing Sheets

CIRCULAR IMAGE FILE

CROSS-REFERENCE TO RELATED APPLICATIONS

This application claims priority to U.S. Provisional Patent App. No. 63/180,367, filed on Apr. 27, 2022, which is hereby incorporated by reference in its entirety.

TECHNICAL FIELD

The present disclosure generally relates to storing image sensor data in a circular image file.

BACKGROUND

Image sensor data is typically stored as an image file that includes a series of pixel values representing a rectangular array of pixels. In some implementations, the pixel values are not representative of real-world content, resulting in stored data with zero signal-to-noise ratio.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
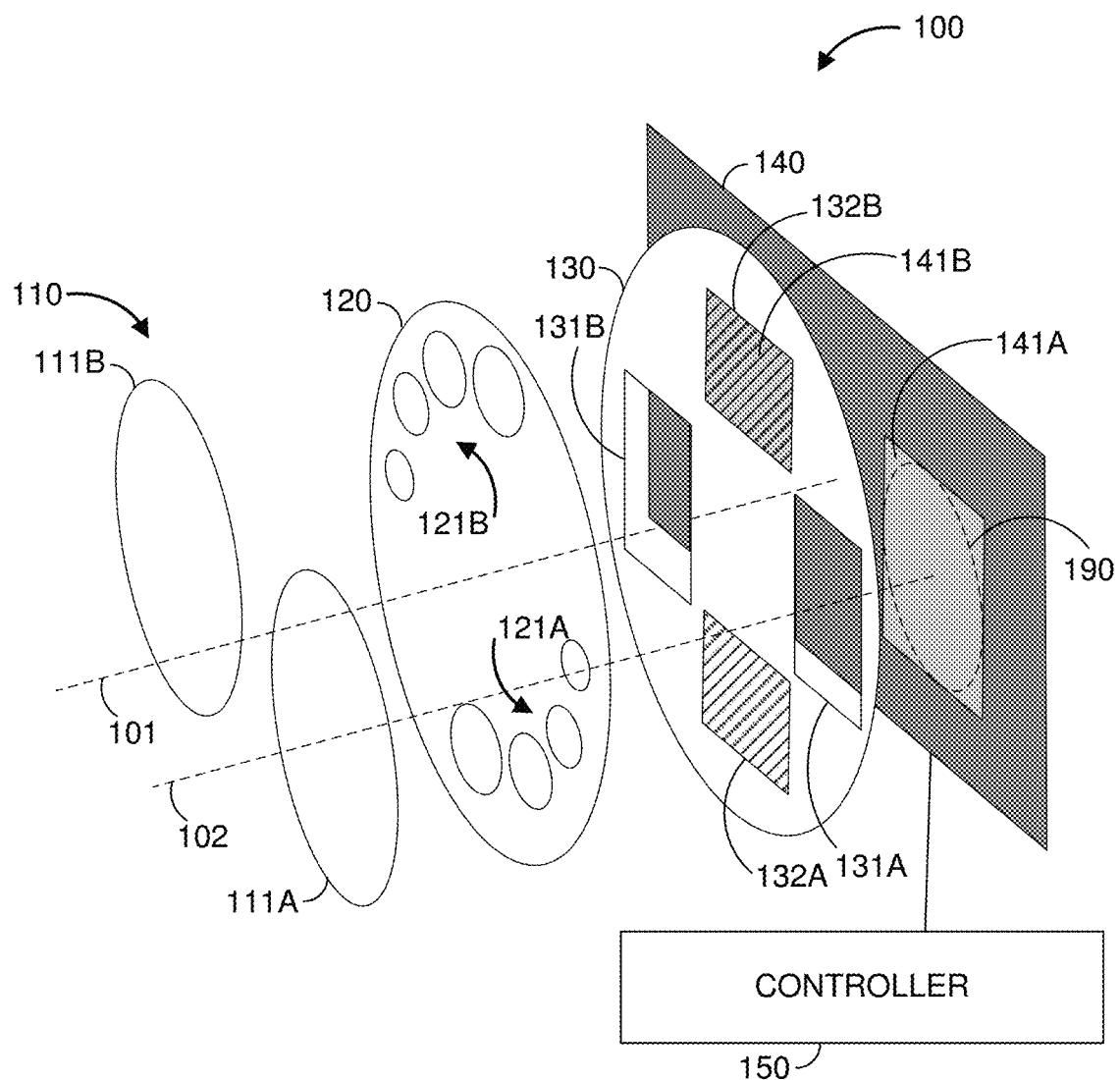
FIG. 1 is an exploded view of a camera in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for generating an image file. In various implementations, the method is performed by a device including an image sensor, one or more processors, and non-transitory memory. The method includes receiving, from the image sensor including a plurality of sensor elements at a respective plurality of first image sensor locations on the image sensor, a plurality of sensor values indicative of a characteristic of light impinging on the plurality of first sensor elements. The method includes generating, based on the plurality of sensor values, an image file including a plurality of pixels having a respective plurality of pixel values, wherein the plurality of pixels are associated with a respective plurality of pixel locations that represent a respective plurality of second image sensor locations on the image sensor. The plurality of second image sensor locations on the image sensor are within a circle and the image file does not include a pixel having a pixel location representing an image sensor location outside the circle and within a square in which the circle is inscribed.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

Image sensor data is typically stored as an image file that includes a series of pixel values representing a rectangular array of pixels. In some implementations, at least some of the pixel values are not representative of real-world content, resulting in stored data with zero signal-to-noise ratio. Disclosed herein are image file formats that exclude these pixel values. Image files in such formats are of smaller size which improves processing speed for processing, reduces bandwidth for transmission, and reduces storage space for storage.

FIG. 1 is an exploded view of a camera in accordance with some implementations. The camera 100 includes a lens assembly 110 including a first lens 111A and a second lens 111B. In various implementations, the first lens 111A and the second lens 111B are fisheye lenses. Thus, in various implementations, the angle of view of the first lens 111A and/or the second lens 111B is between approximately 100 degrees and 180 degrees. In various implementations, the angle of view of the first lens 111A and/or the second lens 111B is approximately 180 degrees.

The camera 100 includes an image sensor assembly 140 including a first image sensor 141A and a second image sensor 141B. In various implementations, the first image sensor 141A and/or the second image sensor 141B is a charged-couple device (CCD) or active-pixel sensor, such as a CMOS sensor. In various implementations, the first image sensor 141A and/or the second image sensor 141B includes a plurality of sensor elements that each generate a sensor value indicative of a characteristic (e.g., brightness and/or color) of light detected by the sensor element.

The image sensor assembly 140 is coupled to a controller 150 which receives the sensor values and generates an image file based on the sensor values. In various implementations, the image file has a resolution of approximately 16000 by 16000. In various implementations, the controller 150 receives the sensor values at a frame rate of approximately 96 to 100 frames per second and generates a video file (including a series of image files) having a frame rate of approximately 96 to 100 frames per second. Accordingly, in various implementations, the image file (or the video file) meets or exceeds the capabilities of normal human vision. In various implementations, the controller 150 includes one or more processors and non-transitory memory.

The camera includes a diaphragm 120 between the lens assembly 110 and the image sensor assembly 140. The diaphragm 120 includes a plurality of first apertures 121A and a plurality of second apertures 121B. The diaphragm 120 is rotatable about a camera axis 101. In various implementations, the controller 150 controls the rotation of the diaphragm 120 about the camera axis 101.

The camera includes a filter wheel 130 between the lens assembly 110 and the image sensor assembly 140. In various implementations, the filter wheel 130 is between the diaphragm 120 and the image sensor assembly 140. In various implementations, the filter wheel 130 is between the diaphragm 120 and the lens assembly 110. The filter wheel 130 includes a first window 131A and a second window 131B. In various implementations, the first window 131A and the second window 131B are clear glass. The filter wheel 130 includes a first filter 132A and a second filter 132B. In various implementations, the first filter 132A and/or the second filter 132B are neutral-density filters. The filter wheel 130 is rotatable about the camera axis 101. In various implementations, the controller 150 controls the rotation of the filter wheel 130 about the camera axis 101.

Light travels in a direction parallel to an optical axis 102 passing through and being refracted by the first lens 111A. The light passes through a particular aperture of the plurality of first apertures 121A. The particular aperture depends on the rotation of the diaphragm 120. In various implementations, the plurality of first apertures 121A are of different sizes, changing the exposure level of the resulting image. The light passes through either the first window 131A or the first filter 132A depending on the rotation of the filter wheel 130. The light impinges on the first image sensor 141A. The light that passes through the first lens 111A impinges on the first image sensor 141A in a circular region of the first image sensor 141A referred to as an image circle 190.

Similarly, light passing through the second lens 111B passes through a particular aperture of the plurality of second apertures 121B, either the second window 131B or the second filter 132B, and impinges on the second image sensor 141B in a circular region of the second image sensor 141B.

Figure 2:
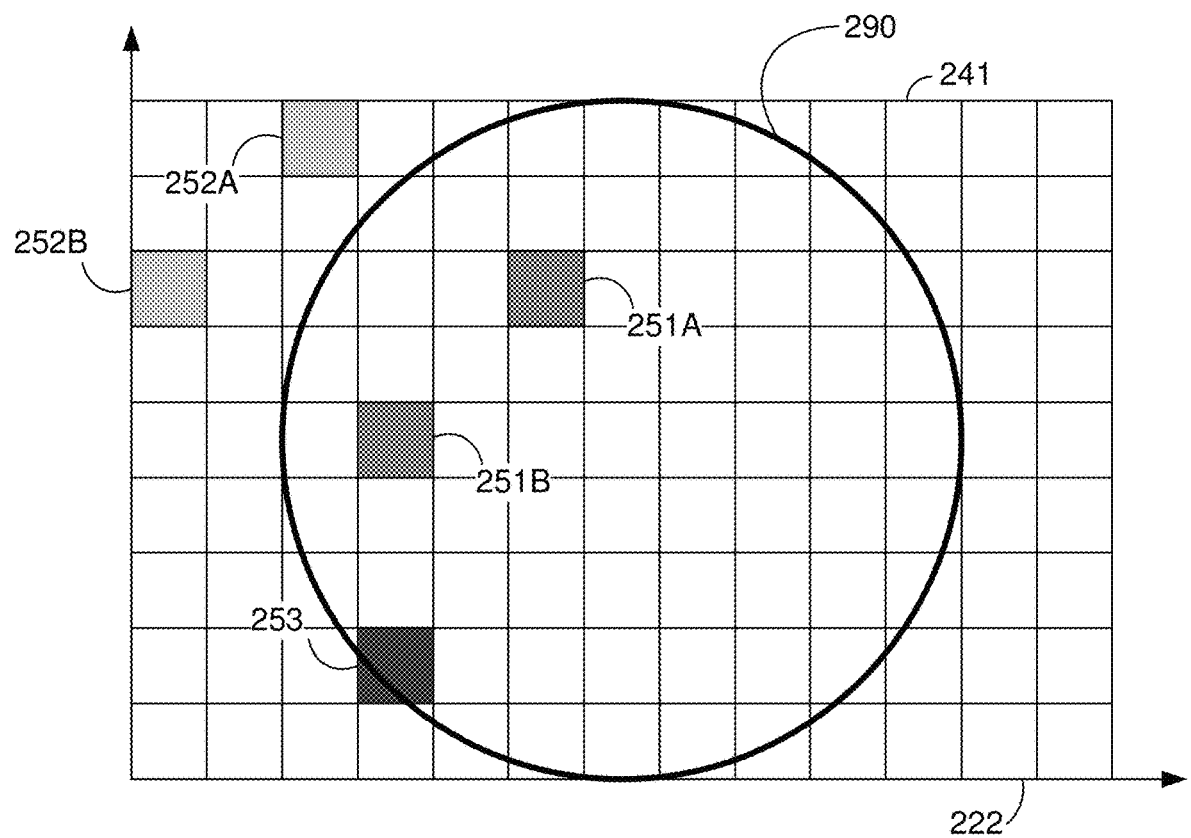
FIG. 2 illustrates an image sensor of a camera in accordance with some implementations.

FIG. 2 illustrates an image sensor 241 of a camera in accordance with some implementations. The image sensor 241 includes a plurality of sensor elements at a respective plurality of sensor element locations in a two-dimensional coordinate system of the image sensor 241, illustrated by the axes 222 in FIG. 2. In FIG. 2, the plurality of sensor elements are arranged in a rectangular matrix. Thus, each of the plurality of sensor element locations lie on a rectangular grid.

Each sensor element generates a respective sensor value indicative of a characteristic of light detected by the sensor element. In particular, each sensor element spans an area surrounding the corresponding sensor element location and generates a sensor value indicative of a characteristic of light impinging on that area. For example, in various implementations, the sensor element generates a sensor value that indicates a brightness of light impinging on the sensor element. In various implementations, the sensor element generates a sensor value including a triplet indicating the color of light impinging on the sensor element.

In various implementations, an image is generated based on the sensor values. In various implementations, an image includes a plurality of pixels at a respective plurality of pixel locations in a two-dimensional coordinate system of the image. The two-dimensional coordinate system of the image is related to the two-dimensional coordinate system of the image by a mapping. In various implementations, the mapping is a linear mapping or proportional mapping. Thus, in various implementations, a pixel location halfway from the bottom of the image and a quarter-way from the left edge of the image corresponds to a sensor element location halfway from the bottom of the image sensor and a quarter-way from the left edge of the image sensor.

Each of the plurality of pixels has a respective pixel value. In various implementations, the pixel value for a pixel at a pixel location is based on the sensor values of one or more sensor elements at or in a neighborhood of the corresponding sensor element location. For example, a pixel halfway from the bottom of the image and a quarter-way from the left edge of the image has a pixel value based on one or more sensor values from one or more sensor elements located halfway from the bottom of the image sensor and a quarter-way from the left edge of the image sensor. In various implementations, the pixel value is based on the sensor value of a single sensor element. In various implementations, the pixel value is based on the sensor values of multiple sensor elements, such as a Bayer filter square of four sensor elements. In various implementations, the pixel value is based on an average of the sensor values from sensor elements within a neighborhood of the corresponding sensor element location (e.g., the four closest sensor elements), weighted by distance from corresponding sensor element location to the sensor element locations of the sensor elements.

In various implementations, the pixel values range from 0 (representing black) to 255 (representing white). In various implementations, the pixel values are RGB color triplets, each element of the triplet representing a color channel and ranging in value from 0 to 255. In various implementations, the pixel values are RGBA vectors, the elements of the vector representing the red channel, green channel, blue channel, and alpha channel.

In various implementations, an image is encoded, e.g., by a codec, into an image file. In various implementations, the image file includes a header and a body. In various implementations, a rectangular image includes an M×N rectangular matrix of pixels, each pixel having a pixel location identified by row and column of the matrix. In various implementations, the header includes a size field that indicates a size of the image. For example, in various implementations, an image file encoding the rectangular image includes a header including a width field indicating a width of the image (e.g., N) and a height field indicating a height of the image (e.g., M).

In various implementations, the body includes the pixel values in a series. For example, in an image file encoding the rectangular image, the first pixel value of the series is the pixel value of the pixel in the first row and first column of the matrix, the second pixel value of the series is the pixel value of the pixel in the first row and second column of the matrix, the Nth pixel value of the series is the pixel value of the last pixel in the first row of the matrix, and the (N+1)th pixel value of the series is the pixel value of the pixel in the second row and first column of the matrix, etc.

FIG. 2 illustrates an image circle 290 superimposed over the image sensor 241. Sensor elements within the image circle 290, such as sensor element 251A and sensor element 251B generate sensor values that are representative of the environment in which the camera is present or of the scene being imaged by the camera. Sensor elements within the image circle 290 generate sensor values having a first signal-to-noise ratio. In contrast, sensor elements outside of the image circle 290, such as sensor element 252A and sensor element 252B, generate sensor values that are not representative of the environment or scene. In various implementations, the sensor values are noise. In various implementations, the sensor values are default values, such as zero. Thus, sensor elements outside of the image circle 290 generate sensor values having a signal-to-noise ratio of zero. Some sensor elements lying on the image circle 290, such as sensor element 253, generates sensor values that are at least partially representative of the environment in which the camera is present or of the scene being imaged by the camera. However, sensor elements lying on the image circle 290 generate sensor values having a signal-to-noise ratio below the first signal-to-noise ratio.

Accordingly, an image file based on the sensor values of all the sensor elements includes data with a signal-to-noise ratio of zero that does not encode information regarding the environment or scene.

Figure 3:
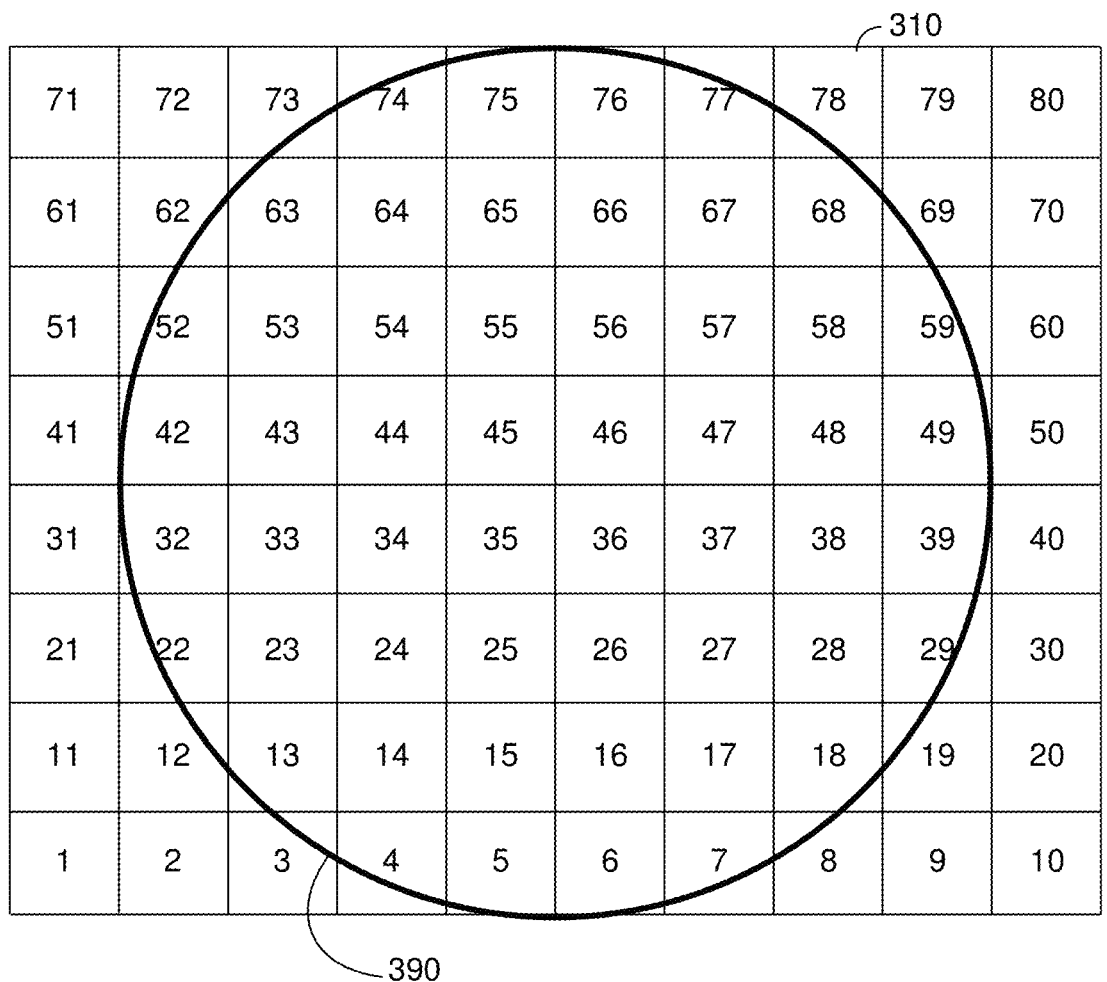
FIG. 3 illustrates an example rectangular image with a row-by-row pixel ordering.

FIG. 3 illustrates an example rectangular image 310 with a row-by-row pixel ordering. The rectangular image 310 includes an 8×10 matrix of pixels represented by squares, the number within each square representing the order of the pixel value in the series in the body of the image file. FIG. 3 further illustrates a circle 390 representing the image circle 290 mapped to the two-dimensional coordinate system of the image 310. Each pixel is at a pixel location in the two-dimensional coordinate system of the image 310 lying on a grid.

Whereas a number of pixels having pixel locations within the circle 390, such as pixel number 24, pixel number 46, and pixel number 67, have pixel values that represent the environment in which the image 310 was taken (with the first signal-to-noise ratio), a number of pixels having pixel locations outside of the circle 390, such as pixel number 2, pixel number 30, and pixel number 51, have pixel values that do not represent the environment in which the image 310 was taken (and have a signal-to-noise ratio of zero).

Although the squares representing pixels, such as pixel number 3, pixel number 22, and pixel number 75, are partially within the circle 390 and partially outside of the circle 390, the pixel location itself (e.g., the center of the square) is either within the circle 390, exactly on the circle 390, or outside of the circle 390.

In various implementations, to reduce the size of the image file, pixel values of pixels outside of the circle 390 are not encoded in the series in the body of the image file. In various implementations, when pixel values of pixels are excluded based on their location relative to the image circle 390, this is indicated in the header of the image file.

Figure 4:
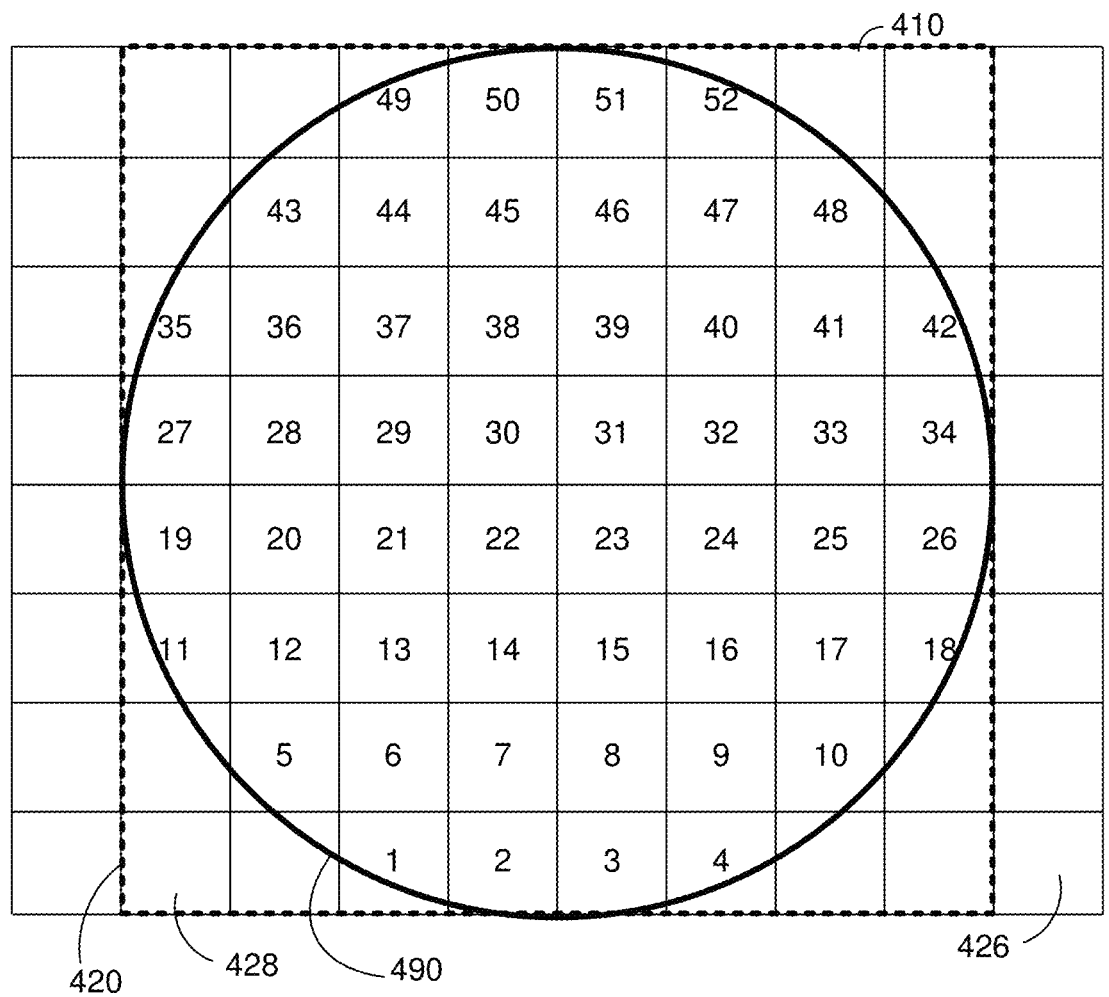
FIG. 4 illustrates an example circular image with a row-by-row pixel ordering.

FIG. 4 illustrates an example circular image 410 with a row-by-row pixel ordering. The circular image 410 includes 52 pixels, represented by squares, at various pixel locations in the two-dimensional coordinate system of the circular image 410, each pixel having a corresponding pixel value. Each pixel is at a pixel location in the two-dimensional coordinate system of the image 410 lying on a grid. In various implementations, the circular image 410 is encoded as an image file having a header and a body. In various implementations, the header includes a shape field having a value that indicates that the circular image 410 is a circular image (and not a rectangular image). In various implementations, the header includes a size field having a value indicating a size of the circular image 410 (e.g., a height of the image 410 in rows). In various implementations, the number of pixels in each row is defined by a standard. In various implementations, the number of pixels in each row is specified in a field of the header. In various implementations, the body includes the pixel values in a series. In FIG. 4, the number within each square represents the order of the pixel value in the series. FIG. 4 further illustrates a circle 490 representing the image circle 290 mapped to the two-dimensional coordinate system of the circular image 410. Each pixel is at a pixel location within the circle 490.

Each pixel location is defined by an x-coordinate and a y-coordinate in the two-dimensional space of the circular image 410. The pixel value of a first pixel at a pixel location with the same y-coordinate as the pixel location of a second pixel, but a higher x-coordinate than the pixel location of the second pixel, is later in the series than the pixel value of the second pixel. The pixel value of a third pixel at a pixel location having a particular y-coordinate is later in the series than the pixel values of all the pixels at pixel locations with a lower y-coordinate.

Whereas the image file for the rectangular image 310 includes pixel values for 80 pixels, the image file for the circular image 410 includes pixel values for 52 pixels. Thus, the size of the image file for the circular image 410 is approximately two-thirds the size of the image file for the rectangular image 310. The image file for the circular image 410 does not include pixel values for pixels outside of the circle 490. For example, the image file for the circular image 410 does not include pixel values for pixels having a pixel location outside a square 420 in which the circle 490 is inscribed, such as pixel 426. Further, the image file for the circular image 410 does not include pixel values for pixels having a pixel location outside of the circle 490, but inside of the square 420 in which the circle 490 is inscribed, such as pixel 428.

Figure 5:
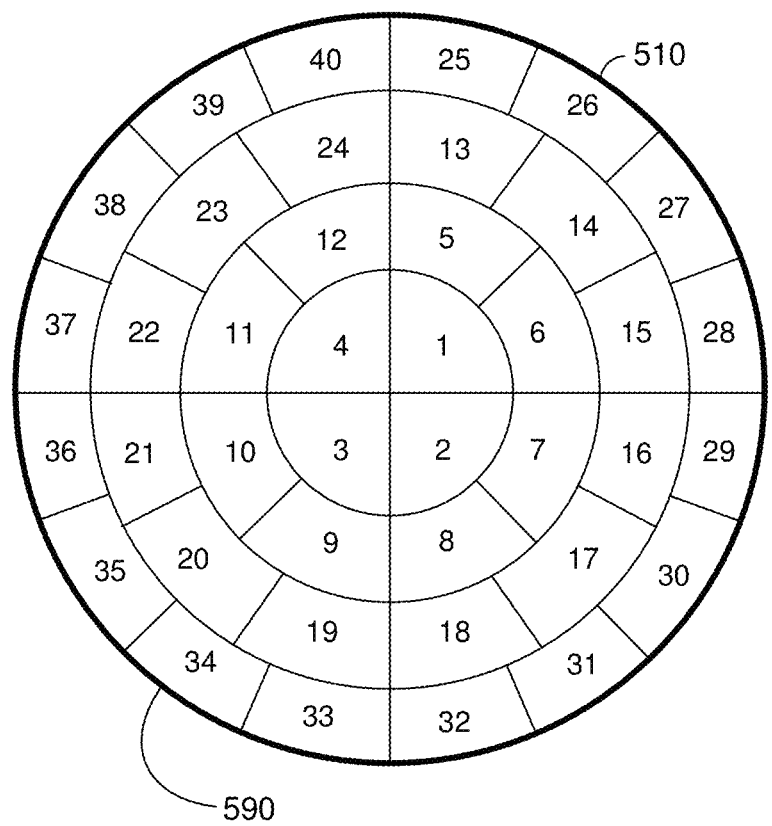
FIG. 5 illustrates an example circular image with a circle-by-circle pixel ordering.

FIG. 5 illustrates an example circular image 510 with a circle-by-circle pixel ordering. The circular image 510 includes 40 pixels, represented by ring segments, at various pixel locations in the two-dimensional coordinate system of the circular image 510, each pixel having a corresponding pixel value. Unlike the circular image 410 of FIG. 4, each pixel is not at a pixel location in the two-dimensional coordinate system of the image 410 lying on a grid. Rather, each pixel is at a pixel location lying on one of a plurality of concentric circles. In various implementations, the circular image 510 is encoded as an image file having a header and a body. In various implementations, the header includes a shape field having a value that indicates that the circular image 510 is a circular image (and not a rectangular image). In various implementations, the header includes an ordering field having a value that indicates an ordering scheme (e.g., row-by-row as in FIG. 4 or circle-by-circle as in FIG. 5). In various implementations, the header includes a size field having a value indicating a size of the circular image 510 (e.g., the number of concentric circles on which the pixel locations lie). In various implementations, the number of pixels on each circle is defined by a standard. In various implementations, the number of pixels on each circle is specified in a field of the header. In various implementations, the body includes the pixel values in a series. In FIG. 5, the number within each square represents the order of the pixel value in the series. FIG. 5 further illustrates a circle 590 representing the image circle 290 mapped to the two-dimensional coordinate system of the circular image 510. Each pixel is at a pixel location within the circle 590.

Each pixel location is defined by an r-coordinate and a θ-coordinate in the two-dimensional space of the circular image 510. The pixel value of a first pixel at a pixel location with the same r-coordinate as the pixel location of a second pixel, but a higher θ-coordinate than the pixel location of the second pixel, is later in the series than the pixel value of the second pixel. The pixel value of a third pixel at a pixel location having a particular r-coordinate is later in the series than the pixel values of all the pixels at pixel locations with a lower r-coordinate.

Figure 6:
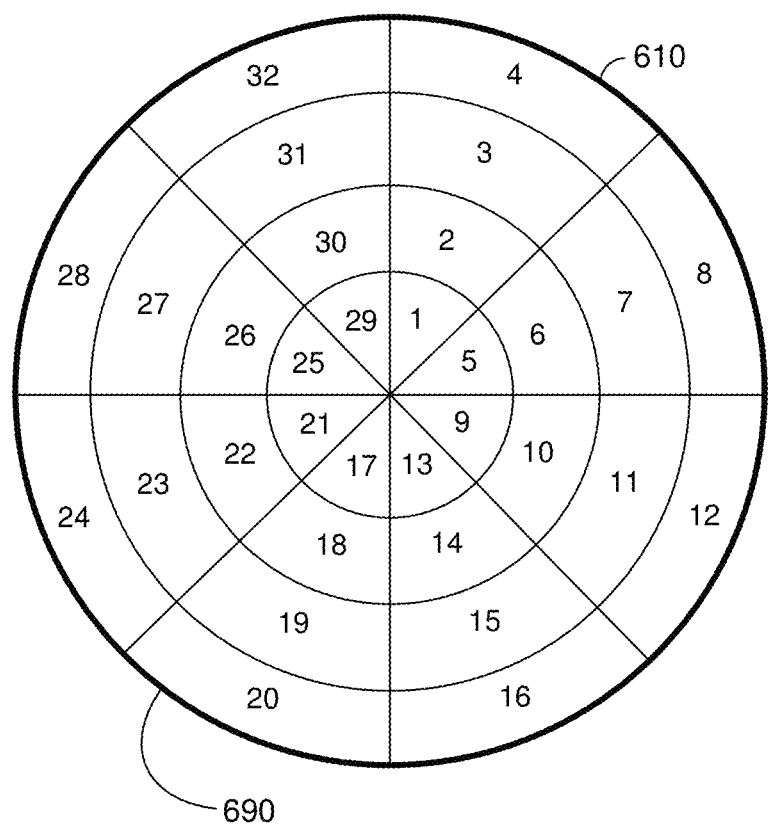
FIG. 6 illustrates an example circular image with a ray-by-ray pixel ordering.

FIG. 6 illustrates an example circular image 610 with a ray-by-ray pixel ordering. The circular image 610 includes 32 pixels, represented by ring segments, at various pixel locations in the two-dimensional coordinate system of the circular image 610, each pixel having a corresponding pixel value. Each pixel is at a pixel location lying on one of a plurality of concentric circles. In various implementations, the circular image 610 is encoded as an image file having a header and a body. In various implementations, the header includes a shape field having a value that indicates that the circular image 610 is a circular image (and not a rectangular image). In various implementations, the header includes an ordering field having a value that indicates an ordering scheme (e.g., row-by-row as in FIG. 4, circle-by-circle as in FIG. 5, or ray-by-ray as in FIG. 6). In various implementations, the header includes a size field having a value indicating a size of the circular image 610 (e.g., the number of concentric circles on which the pixel locations lie). In various implementations, the number of pixels on each circle is defined by a standard. In various implementations, the number of pixels on each circle is specified in a field of the header. In various implementations, the body includes the pixel values in a series. In FIG. 6, the number within each square represents the order of the pixel value in the series. FIG. 6 further illustrates a circle 690 representing the image circle 290 mapped to the two-dimensional coordinate system of the circular image 610. Each pixel is at a pixel location within the circle 690.

Each pixel location is defined by an r-coordinate and a θ-coordinate in the two-dimensional space of the circular image 610. The pixel value of a first pixel at a pixel location with the same θ-coordinate as the pixel location of a second pixel, but a higher r-coordinate than the pixel location of the second pixel, is later in the series than the pixel value of the second pixel. The pixel value of a third pixel at a pixel location having a particular θ-coordinate is later in the series than the pixel values of all the pixels at pixel locations with a lower θ-coordinate.

Figure 7:
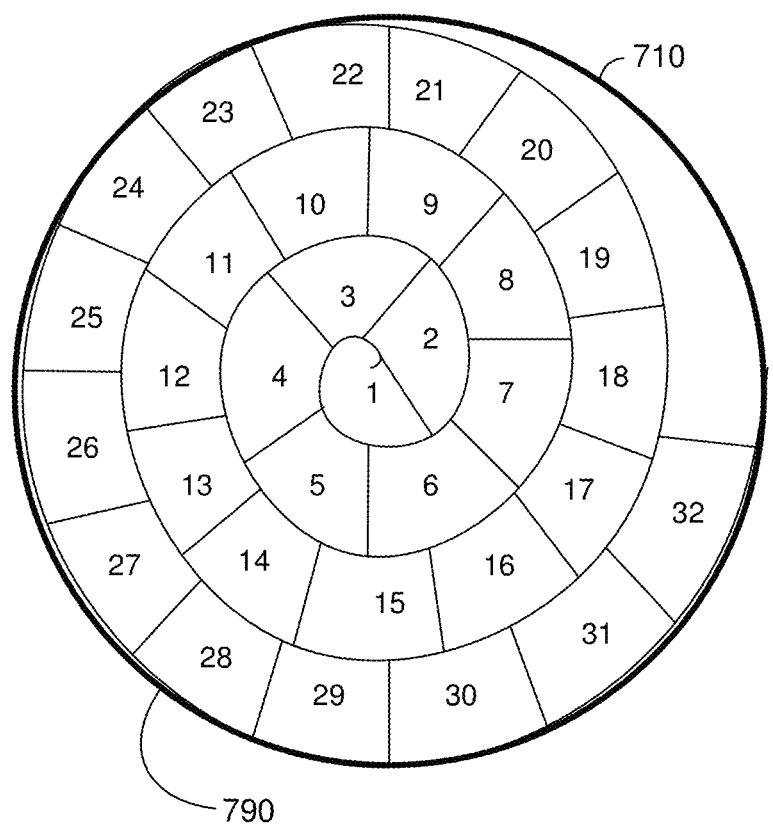
FIG. 7 illustrates an example circular image with a spiral pixel ordering.

FIG. 7 illustrates an example circular image 710 with a spiral pixel ordering. The circular image 710 includes 32 pixels, represented by ring segments, at various pixel locations in the two-dimensional coordinate system of the circular image 710, each pixel having a corresponding pixel value. Each pixel is at a pixel location lying on a spiral (e.g., an Archimedean spiral). In various implementations, the circular image 710 is encoded as an image file having a header and a body. In various implementations, the header includes a shape field having a value that indicates that the circular image 710 is a circular image (and not a rectangular image). In various implementations, the header includes an ordering field having a value that indicates an ordering scheme (e.g., row-by-row as in FIG. 4, circle-by-circle as in FIG. 5, ray-by-ray as in FIG. 6, or spiral as in FIG. 7). In various implementations, the header includes a size field having a value indicating a size of the circular image 710 (e.g., the length of the spiral). In various implementations, the number of pixels per unit length along the spiral is defined by a standard. In various implementations, the number of pixels per unit length along the spiral is specified in a field of the header. In various implementations, the body includes the pixel values in a series. In FIG. 7, the number within each square represents the order of the pixel value in the series. FIG. 7 further illustrates a circle 790 representing the image circle 290 mapped to the two-dimensional coordinate system of the circular image 710. Each pixel is at a pixel location within the circle 790.

Each pixel location is defined by an r-coordinate and a θ-coordinate in the two-dimensional space of the circular image 710. The $N^{th}$ pixel is located at a pixel location having an r-coordinate of aN and a θ-coordinate of bN+c, where a, b, and c are constants which may be defined by a standard or specified in the header.

Figure 8:
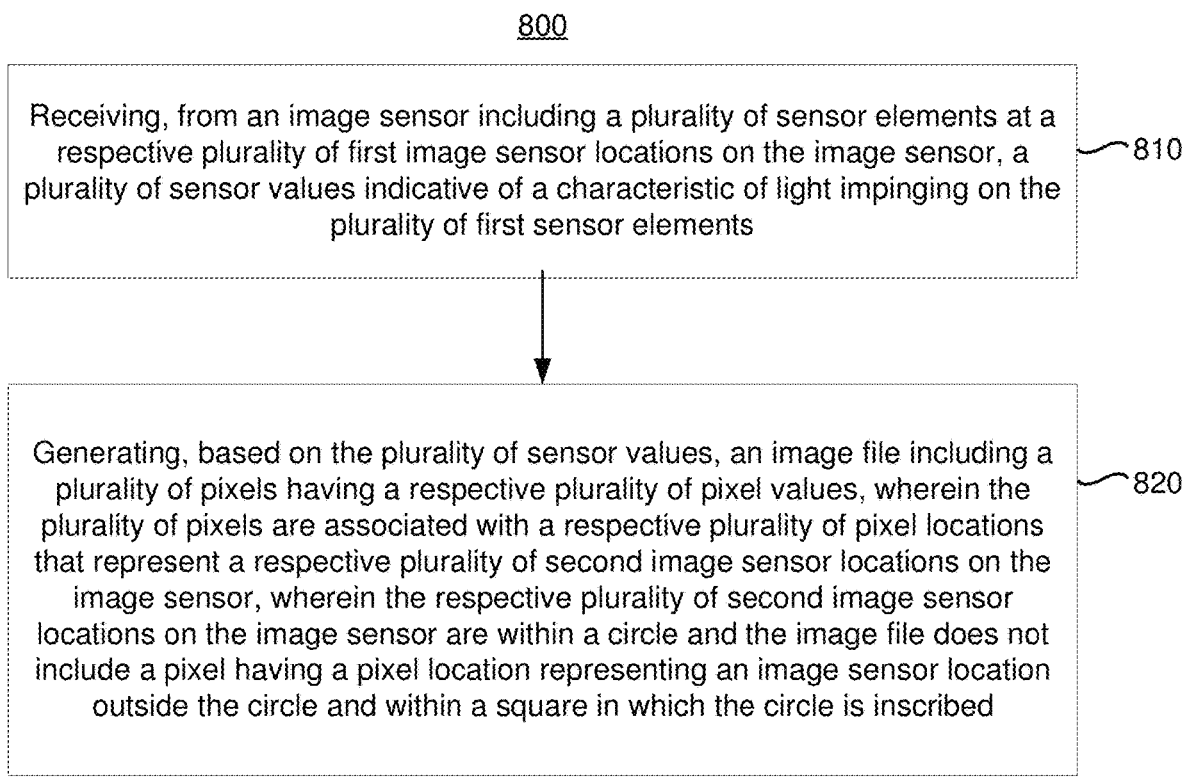
FIG. 8 is a flowchart representation of generating an image file in accordance with some implementations.

FIG. 8 is a flowchart representation of a method 800 of generating an image file in accordance with some implementations. In various implementations, the method 800 is performed by a device including an image sensor, one or more processors, and non-transitory memory (e.g., the camera 100 of FIG. 1). In some implementations, the method 800 is performed by processing logic, including hardware, firmware, software, or a combination thereof. In some implementations, the method 800 is performed by a processor executing instructions (e.g., code) stored in a non-transitory computer-readable medium (e.g., a memory).

The method 800 begins, in block 810, with the device receiving, from an image sensor including a plurality of sensor elements at a respective plurality of first image sensor locations on the image sensor, a plurality of sensor values indicative of a characteristic of light impinging on the plurality of first sensor elements. For example, FIG. 1 illustrates the controller 150 that receives a plurality of sensor values from the first image sensor 141A.

The method 800 continues, in block 820, with the device generating, based on the plurality of sensor values, an image file including a plurality of pixels having a respective plurality of pixel values, wherein the plurality of pixels are associated with a respective plurality of pixel locations that represent a respective plurality of second image sensor locations on the image sensor. For example, FIG. 1 illustrates the controller 150 that generates an image file based on the plurality of sensor values.

In various implementations, the plurality of second image sensor locations on the image sensor are within a circle and the image file does not include a pixel having a pixel location representing an image sensor location outside the circle and within a square in which the circle is inscribed. For example, FIG. 1 illustrates the controller 150 that generates an image file with pixels that represent locations within the image circle 190.

In various implementations, the image sensor includes at least one sensor element at an image sensor location outside the circle and within the square. Thus, in various implementations, at least one of the plurality of sensor values is generated by a sensor element at an image sensor location outside the circle and within the square. For example, FIG. 1 illustrates a first image sensor 141A that includes sensor elements outside the image circle 190. As another example, in FIG. 2, the image sensor 241 includes sensor element 252A outside the image circle 290 but within a square in which the circle is inscribed.

In various implementations, the image sensor does not include a sensor element at an image location outside the circle and within the square. Thus, in various implementations, none of the plurality of sensor values is generated by a sensor element at an image location outside the circle and within the square. In various implementations, the device includes a circular image sensor including sensor elements arranged in a circle. Whereas FIGS. 4-7 illustrate circular images including a plurality of pixels in various spatial arrangements, in various implementations, the same Figures represent circular image sensors including a plurality of sensor elements in those various spatial arrangements.

In various implementations, the device further comprises a lens configured to generate an image circle within the circle. Thus, in various implementations, the circle surrounds an image circle generated by a lens. For example, FIG. 1 illustrates the first lens 111A that generates the image circle 190. In various implementations, the lens is a fisheye lens.

In various implementations, the plurality of second image sensor locations are the same as the plurality of first image sensor locations. Thus, in various implementations, a particular pixel of the image is based on the sensor value from a single respective sensor element. In various implementations, the plurality of second image sensor locations are different than the plurality of first image sensor locations. Thus, in various implementations, a particular pixel of the image is based on the sensor value from multiple sensor elements, e.g., those having first image sensor locations closest to the second image sensor location.

In various implementations, the plurality of pixel locations maps linearly to the plurality of second image sensor locations. For example, in various implementations, a pixel location halfway from the bottom of the image and a quarter-way from the left edge of the image corresponds to an image sensor location halfway from the bottom of the image sensor and a quarter-way from the left edge of the image sensor. As another example, in various implementations, wherein a first pixel location corresponds to a first image sensor location and a second pixel location corresponds to a second image sensor location, a pixel location midway between the first pixel location and the second pixel location corresponds to an image sensor location midway between the first image sensor location and the second image sensor location.

In various implementations, the plurality of pixel locations lie on a grid. For example, in FIG. 4, the pixel locations lie on a grid. In various implementations, the plurality of pixel locations lie on a plurality of concentric circles. For example, in FIG. 5 and FIG. 6, the plurality of pixel locations lie on a plurality of concentric circles. In various implementations, the plurality of pixel locations lie on a spiral. For example, in FIG. 7, the plurality of pixel locations lie on a spiral.

In various implementations, the image file includes a header and a body, wherein the body includes the plurality of pixel values in series, wherein the header includes at least one field having a value indicating the plurality of pixel locations. In various implementations, the plurality of pixel locations is indicated by a value in a shape field that indicates that the image file represents a circular image or a rectangular image. In various implementations, the plurality of pixel locations is indicated by a value in an ordering field that indicates an ordering scheme, such as row-by-row as in FIG. 4, circle-by-circle as in FIG. 5, ray-by-ray as in FIG. 6, or spiral as in FIG. 7. In various implementations, the plurality of pixel locations is indicated by a value in a size field that indicates a size of the image represented by the image file, such as a number of rows, a number of circles, a number of rays, or a length of a spiral. In various implementations, the plurality of pixel locations is indicated by a value in a resolution field that indicates a resolution of the image represented by the image file, such as a number of pixels in each row, a number of pixels in each circle, a number of pixels in each ray, or a number of pixels in a spiral.

In various implementations, the method 800 further includes storing the image file in a non-transitory memory. In various implementations, the method 800 further includes transmitting the image file over a communications interface. In various implementations, the method 800 includes processing the image file without converting a circular image to a rectangular image, such as compressing the image file or filtering the image represented by the image file.

In various implementations, the device further comprises a second image sensor including a plurality of second sensor elements at a respective plurality of second image sensor locations on the second image sensor, and the method 800 further includes receiving, from the second image sensor, a plurality of second sensor values indicative of a characteristic of light impinging on the plurality of second sensor elements and generating the image file based on the plurality of second sensor values. Thus, in various implementations, the method 800 further includes receiving, from a second image sensor including a plurality of second sensor elements at a respective plurality of second image sensor locations on the second image sensor, a plurality of second sensor values indicative of a characteristic of light impinging on the plurality of second sensor elements, wherein the image file is further based on the plurality of second sensor values. For example, in FIG. 1, the camera 100 includes the second image sensor 141B.

In various implementations, the plurality of pixel values are based on the plurality of sensor values and the plurality of second sensor values. For example, in various implementations, a particular pixel at a particular pixel location has a value of a six-element vector including a red channel based on a particular sensor value, a blue channel based on the particular sensor value, a green channel based on the particular sensor value, a red channel based on a particular second sensor value, a blue channel based on the particular second sensor value, and a green channel based on the particular second sensor value.

In various implementations, the image file includes the plurality of pixel values based on the plurality of sensor values and separately includes a plurality of second pixel values based on the plurality of second sensor values.

Thus, in various implementations, the image file includes a single stereoscopic circular image. In various implementations, the image file includes two separate circular images.

Accordingly, in various implementations, the device is a camera that includes an image sensor including a plurality of image sensor elements, wherein each of the plurality of image sensor elements generates a sensor value indicative of a property of light projected onto the image sensor element. The camera includes a lens that projects an image circle onto the image sensor, wherein the image circle is projected onto a subset of the plurality of image sensor elements, wherein the subset of the plurality of image sensor elements generates a first set of sensor values and others of the plurality of image sensor elements generate a second set of sensor values. The camera includes a processor configured to execute an image codec that generates an image file based on the first set of sensor values without being based on the second set of sensor values.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A camera comprising:
   an image sensor including a plurality of sensor elements;
   a controller to:
   receive, from the image sensor, a plurality of sensor values indicative of a characteristic of light impinging on the plurality of sensor elements; and
   generate, based on the plurality of sensor values, an image file including a plurality of pixels having a respective plurality of pixel values at a respective plurality of pixel locations, wherein the image file includes a header and a body, wherein the body includes the plurality of pixel values in an order in series and the header includes a shape field having a value indicating that the image file is a circular image file including a pixel having a pixel location within a first square, including a pixel having a pixel location outside the first square and within a circle circumscribing the first square, and not including a pixel having a pixel location outside the circle and within a second square in which the circle is inscribed.

2. The camera of claim 1, wherein the image sensor includes at least one sensor element at an image sensor location corresponding to a pixel location outside the circle and within the second square.

3. The camera of claim 1, wherein the image sensor does not include a sensor element at an image sensor location corresponding to a pixel location outside the circle and within the second square.

4. The camera of claim 1, further comprising a lens configured to generate an image circle within the circle.

5. The camera of claim 4, wherein the lens is a fisheye lens.

6. The camera of claim 1, wherein the plurality of pixel locations lie on a grid.

7. The camera of claim 1, wherein the header further includes an ordering field having a value indicating an ordering scheme relating the order of the plurality of pixels to the plurality of pixel locations.

8. The camera of claim 7, wherein the ordering scheme relates continuous portions of the plurality of pixels to rows of the plurality of pixel locations.

9. The camera of claim 8, wherein the header further includes a size field having a value indicating a number of the rows.

10. The camera of claim 7, wherein the ordering scheme relates an earlier continuous portion of the plurality of pixels to locations within a central region of the plurality of pixel locations and relates a later continuous portion of the plurality of pixels to locations outside the central region of the plurality of pixel locations.

11. The camera of claim 10, wherein the ordering scheme relates the plurality of pixels to a spiral passing through the plurality of pixel locations.

12. The camera of claim 1, further comprising a second image sensor including a plurality of second sensor elements, wherein the controller is further to receive, from the second image sensor, a plurality of second sensor values indicative of a characteristic of light impinging on the plurality of second sensor elements and generate the image file based on the plurality of second sensor values.

13. The camera of claim 1, wherein the controller is further to store the image file in a non-transitory memory or transmit the image file over a communications interface.

14. A method comprising:
   receiving, from an image sensor including a plurality of sensor elements, a plurality of sensor values indicative of a characteristic of light impinging on the plurality of sensor elements; and
   generating, based on the plurality of sensor values, an image file including a plurality of pixels having a respective plurality of pixel values at a respective plurality of pixel locations, wherein the image file includes a header and a body, wherein the body includes the plurality of pixel values in an order in series and the header includes a shape field having a value indicating that the image file is a circular image file including a pixel having a pixel location within a first square, including a pixel having a pixel location outside the first square and within a circle circumscribing the first square, and not including a pixel having a pixel location outside the circle and within a second square in which the circle is inscribed.

15. The method of claim 14, wherein at least one of the plurality of sensor values is generated by a sensor element at an image sensor location corresponding to a pixel location outside the circle and within the second square.

16. The method of claim 14, wherein the header further includes an ordering field having a value indicating an ordering scheme relating the order of the plurality of pixels to the plurality of pixel locations.

17. The method of claim 16, wherein the ordering scheme relates continuous portions of the plurality of pixels to rows of the plurality of pixel locations.

18. The method of claim 16, wherein the ordering scheme relates an earlier continuous portion of the plurality of pixels to locations within a central region of the plurality of pixel locations and relates a later continuous portion of the plurality of pixels to locations outside the central region of the plurality of pixel locations.

19. A non-transitory memory storing one or more programs, which, when executed by one or more processors of a device including an image sensor, cause the device to:
receive, from an image sensor including a plurality of sensor elements, a plurality of sensor values indicative of a characteristic of light impinging on the plurality of sensor elements; and
generate, based on the plurality of sensor values, an image file including a plurality of pixels having a respective plurality of pixel values at a respective plurality of pixel locations, wherein the image file includes a header and a body, wherein the body includes the plurality of pixel values in an order in series and the header includes a shape field having a value indicating that the image file is a circular image file including a pixel having a pixel location within a first square, including a pixel having a pixel location outside the first square and within a circle circumscribing the first square, and not including a pixel having a pixel location outside the circle and within a second square in which the circle is inscribed.

20. The non-transitory memory of claim 19, wherein the header further includes an ordering field having a value indicating an ordering scheme relating the order of the plurality of pixels to the plurality of pixel locations.

* * * * *